(12) United States Patent
Siessegger et al.

(10) Patent No.: US 12,428,156 B2
(45) Date of Patent: Sep. 30, 2025

(54) AIRCRAFT AND AIRCRAFT STOWAGE COMPARTMENT HAVING A FORCE ASSISTANCE SYSTEM

(71) Applicant: Diehl Aviation Laupheim GmbH, Laupheim (DE)

(72) Inventors: Daniel Siessegger, Achstetten (DE); Dirk Pfinder, Balzheim (DE)

(73) Assignee: Diehl Aviation Laupheim GmbH, Laupheim (DE)

( * ) Notice: Subject to any disclaimer, the term of this patent is extended or adjusted under 35 U.S.C. 154(b) by 0 days.

(21) Appl. No.: 18/760,256

(22) Filed: Jul. 1, 2024

(65) Prior Publication Data
US 2025/0010991 A1 Jan. 9, 2025

(30) Foreign Application Priority Data
Jul. 6, 2023 (DE) ............... 10 2023 117 787.7

(51) Int. Cl.
*B64D 11/00* (2006.01)
(52) U.S. Cl.
CPC ................. *B64D 11/003* (2013.01)
(58) Field of Classification Search
CPC ...... B64D 11/007; B61D 37/003; B60R 5/003
See application file for complete search history.

(56) References Cited

U.S. PATENT DOCUMENTS

| 8,770,515 | B1* | 7/2014 | Cloud | B64D 11/003 |
| | | | | 244/118.5 |
| 10,315,768 | B2* | 6/2019 | Schörkhuber | B64D 11/003 |
| 11,192,650 | B2* | 12/2021 | Fischer | B64D 11/003 |
| 2011/0253714 | A1 | 10/2011 | Ivester et al. | |
| 2014/0283336 | A1 | 9/2014 | Cloud et al. | |

FOREIGN PATENT DOCUMENTS

| DE | 102020000834 A1 | 8/2021 |
| EP | 3371052 B1 | 9/2019 |

\* cited by examiner

*Primary Examiner* — Richard Green
(74) *Attorney, Agent, or Firm* — Laurence A. Greenberg; Werner H. Stemer; Ralph E. Locher

(57) ABSTRACT

An aircraft stowage compartment includes a main body, a swiveling compartment swiveling relative to the main body, and a spring unit therebetween. In an active state, a spring device of the spring unit generates closing forces on the swiveling compartment prevented in a passive state. A connection unit with a connection element in biased zero position switches on the passive state and in connection position switches on the active state. The connection unit has a locking device biased towards locking, for the connection element in the connection position. The connection unit has a release element for the locking device actuatable from biased rest position into release position. In the rest position, locking of the connection element in the connection position is enabled by the locking device and prevented in the release position. An aircraft includes a basic structure, the stowage compartment and the main body fixed to the basic structure.

14 Claims, 7 Drawing Sheets

AIRCRAFT AND AIRCRAFT STOWAGE COMPARTMENT HAVING A FORCE ASSISTANCE SYSTEM

CROSS-REFERENCE TO RELATED APPLICATION

This application claims the priority, under 35 U.S.C. § 119, of German Patent Application DE 10 2023 117 787.7, filed Jul. 6, 2023; the prior application is herewith incorporated by reference in its entirety.

FIELD AND BACKGROUND OF THE INVENTION

The invention relates to an aircraft and a stowage compartment for an aircraft having a force assistance system for closing and opening the stowage compartment.

U.S. Publication No. 2014/0283336 A1 discloses a method and a device for assisting the movement of a stowage compartment into a closed position. An assistance system associated with the stowage compartment can be activated in response to actuation of a switch associated with the stowage compartment. The assistance system may include a biasing system and a switch. The biasing system may be configured to generate a force in a direction towards a closed position for the stowage compartment. A switch may be connected to the biasing system and configured to activate the biasing system when a selected amount of weight is present in the stowage compartment. The force towards the closed position for the stowage compartment may be generated in response to activation of the assistance system.

German Publication DE 10 2020 000 834 A1 discloses a stowage compartment for an aircraft, with a stowage compartment housing for attachment to an aircraft structure, with a swiveling compartment for receiving stowage material, wherein the swiveling compartment is mounted in the stowage compartment housing via a swivel bearing in a swivel range so as to swivel about a swivel axis between an open position and a closed position, with a force assistance device, wherein the force assistance device has an assisting force unit, wherein the assisting force unit can optionally be brought into an active state or a passive state, wherein, in the active state, the assisting force unit provides an assisting force acting in the direction of the closed position, wherein the assisting force brings about a force assistance on the swiveling compartment during a closing movement of the swiveling compartment from the open position in the direction of the closed position, wherein the assisting force unit has a spiral spring for generating the assisting force, wherein the spiral spring is accommodated in a receiving housing disposed on the stowage compartment housing, wherein a spring end of the spiral spring can be brought into operative connection with the swiveling compartment in the active state in order to apply the assisting force to the swiveling compartment.

A lifting aid mechanism is known from U.S. Publication No. 2011/0253714 A1, which is used to support the lifting of a movable component that can move relative to a fixed structure between a lowered and a raised position. The lifting aid mechanism includes a lifting aid spring connected to a spring shaft and an extended rail in which one end of the lifting aid spring or one end of the spring shaft is movably mounted. A spring lock prevents the spring shaft from moving when no lifting assistance is required and releases the spring shaft when lifting assistance is required.

An overhead luggage compartment for an aircraft is known from European Patent EP 3 371 052 B1, corresponding to U.S. Pat. No. 10,315,768 B2, with an upper luggage compartment element, with a lower luggage compartment element which is movable between a closed position and an open position, with a holding device for holding the lower luggage compartment element in its closed position, with a lifting spring for supporting the movement of the lower luggage compartment element from the open position into the closed position, and with a retaining device for fixing the lifting spring in the tensioned state in the open position of the lower luggage compartment element, wherein an actuating handle is provided for releasing the retaining device in the open position of the lower luggage compartment element, wherein the lower luggage compartment element is movable from the open position in the direction of the closed position independently of its loading state, optionally with support from the lifting spring or with the lifting spring fixed in the tensioned state.

SUMMARY OF THE INVENTION

It is accordingly an object of the invention to provide an aircraft and an aircraft stowage compartment having a force assistance system, which overcome the hereinafore-mentioned disadvantages of the heretofore-known devices of this general type and which provide improvements with regard to force assistance when closing a stowage compartment.

The problem is solved by a stowage compartment as described below. Preferred or advantageous embodiments of the invention and other categories of the invention can be found in the further claims, the following description and the appended figures.

With the foregoing and other objects in view there is provided, in accordance with the invention, a stowage compartment for an aircraft, in particular an overhead stowage compartment, in particular for a passenger aircraft or its passenger cabin. This is based on an aircraft that has a mechanically load-bearing basic structure, for example a corresponding outer shell, frames, etc.

The stowage compartment contains a main body. The main body can be fixed to a basic structure of the aircraft. In an intended installation state in the aircraft, the main body and thus the entire stowage compartment is fixedly installed, i.e. fixed, to the base structure in the aircraft by its main body. The stowage compartment contains a swiveling compartment. The swiveling compartment is pivotably mounted relative to the fixed main body between an open position and a closed position. The bearing is located in particular on the main body, but can also be located alternatively on the base structure, for example.

The stowage compartment contains a spring unit. This is disposed on the main body on the one hand and the swiveling compartment on the other and is therefore motion-coupled to both parts, in particular attached to both parts in an articulated manner. The spring unit can be switched between an active state and a passive state. The spring unit contains a spring device, e.g. a mechanical spring.

In the active state, the spring device can relax, i.e. expand longitudinally, thereby exerting its spring force. The relaxation of the spring device leads to the generation of a closing force/support on the swiveling compartment during a movement of the swiveling compartment in the direction from the open position to the closed position and vice versa. In other words, the spring device or the spring unit provides closing force assistance for the swiveling compartment, the relaxation and expansion of the spring device follows the swiveling movement. The spring device is therefore taut in the open position and relaxed or at least more relaxed in the closed position, depending on how the force assistance characteristics are intended and desired. The force assistance can also end before the closed position is reached, etc.

In the passive state, however, the spring device is prevented from relaxing. Consequently, there is no force assistance for a closing movement of the swiveling compartment in the passive state. In the passive state, compression of the spring device or a standstill of the spring device is therefore possible at best. A (one-off) force assistance when the swiveling compartment is opened is possible or necessary in order to compress the relaxed spring device in the passive state if necessary, for example if it was previously in the active state and is still at least partially relaxed/extended.

As a rule, or after a single compression, the spring device is fully compressed or tensioned in the passive state and then remains in this state until the transition to the active state.

The stowage compartment contains a connection unit that is operatively coupled to the spring unit. The expression "operatively coupled" means that the connection unit can or does cause the spring unit to switch between the active and passive state. The connection unit contains a connection element that can be moved from a zero position to a connection position. In the zero position, the spring unit is switched to the passive state. In the connection position, the spring unit is switched to the active state.

The connection element is biased towards the zero position. It therefore automatically returns from the connection position to the zero position if it is not prevented from doing so. This can be prevented, for example, by a user manually holding the connection element in the connection position.

The connection unit has a locking device for the connection element in the connection position. The locking device is biased towards locking the connection element. As soon as the connection element reaches the connection position, the locking device therefore locks the connection element in the connection position. The locking device therefore ensures that the connection element is locked in the connection position and no longer returns to the zero position. In other words, it is locked automatically when the connection position is reached. The connection element is therefore configured to lock automatically. The locking device can act directly on the connection element or also indirectly on an element coupled to the connection element, e.g. a lever mechanism.

The connection unit contains a release element for the locking device. The release element can be actuated from a rest position to a release position. In the rest position, the locking device can be used to lock the connection element in the connection position. In the release position, locking of the connection element is prevented by the locking device. The release element is biased towards the rest position. This means that the release element must be deliberately brought into the release position, e.g. by manual movement by a person or by moving it against a stop, in order to prevent it from locking. If the release element is "released", it returns to the rest position. "Prevention" of locking device that in the release position, both an existing locking is released and re-locking is prevented.

The stowage compartment according to the invention therefore has the following operating properties:

The spring unit is initially assumed to be in a passive state and the spring device is fully compressed. The connection element is in the zero position and the release element is in the rest position. The swiveling compartment can then be moved or swiveled between the open position and the closed position without any force assistance from the spring unit.

By actuating the connection element to the connection position, the spring unit is switched to the active state so that from then on the swiveling compartment can be moved between the open position and the closed position with the help of force assistance from the spring unit. The locking device automatically locks the connection element in the connection position and the active state is maintained.

Only when the release element is moved to the release position is the locking of the connection element in the connection position cancelled, the connection element returns to the zero position, whereby the spring unit enters the passive state and the force assistance of the swiveling compartment ends. If necessary, the spring device must be compressed again by moving the swiveling compartment from the closed position to the open position against the force of the spring device.

According to the invention, moving the connection element into the connection position causes the force assistance to remain switched on and activated until it is cancelled again by actuating the release element. All this can be achieved purely mechanically by using spring/tensioning elements and mechanics. Neither an electrical supply to the stowage compartment nor any kind of weighing device/weighing measure on the stowage compartment is required. The stowage compartment is easy to realize.

In a preferred embodiment, the connection unit is a push-button unit and the connection element is a push-button. The push-button can be moved from the zero position to the connection position by pressing it, i.e. pushing it. In particular, pressing takes place along a straight path of movement. A push-button solution that is locked in the pressed state (connection position) is particularly convenient for holding or locking the spring unit in the active state.

In a preferred embodiment, the connection unit is operatively coupled to the spring unit via a pulling device. In particular, the connection unit pulls the pulling device by moving the connection element from the zero position to the connection position, for example by pressing the push-button. A corresponding pulling device, for example in the form of a cable pull or Bowden cable, can be integrated into a stowage compartment particularly easily and reliably.

In a preferred embodiment, the connection element is biased from the connection position to the zero position by a restoring force from outside the connection unit. The source/cause of the force, e.g. a spring or tensioning element, is therefore located outside the connection unit. In particular, the restoring force is applied to the connection unit from outside via the above-mentioned pulling device. In particular, the restoring force is generated in the spring unit, especially the spring device. For example, the restoring force is generated via a spring-loaded lever in or on a gas pressure spring, as explained below. This eliminates the need to provide a separate restoring or spring/tensioning element for the connection element in the connection unit.

In a preferred embodiment, the spring unit contains a gas pressure spring as spring device. Gas pressure springs are particularly suitable as spring device in the spring unit, as they can be easily switched from an active to a passive state themselves using pins/valves. Other measures in the spring unit to switch it on the whole from active to passive are then no longer necessary.

A valve/pin of this type can itself be biased by tensioning device/springs. These can then be used to transfer this spring force/tensioning force to the connection unit and to bias the connection element to the zero position there. This results in a very simple overall configuration of the stowage compartment.

In a preferred variant of this embodiment, the spring unit is thus switched between active and passive states or is switched over by actuating (moving/opening or closing) a resiliently biased actuating element (lever/valve/pin) of the gas pressure spring. This makes it particularly easy and reliable to switch between the active and passive states and the resilient bias can also be used synergistically in the activation unit.

In a preferred embodiment, the main body or the basic structure has a counter element for the release element or such an element is integrated therein. At least—in particular exclusively—in the closed position of the swiveling compartment, the release element is brought into the release position by the counter element. This ensures that the release element is brought into the release position at least by moving the swiveling compartment into the closed position or optionally by other contact between the counter element and the release element. This causes the locking/locking device to be released and the connection element to return to the zero position, thereby returning the spring unit to its passive state.

The force assistance at the swiveling compartment is thus automatically deactivated in the closed position, although a subsequent opening movement may still be force-assisted if the spring element is still expanded and must first be compressed against its spring force by moving it into the open position, as explained above.

Such a counter element can, for example, be embodied as a stop element for a release element (e.g. toggle lever, see below) on the main body.

In a preferred embodiment, the release element is accessible for manual actuation from an external space outside the stowage compartment, at least in the open position of the swiveling compartment. The accessibility relates at least to being able to move the release element manually towards the release position. This means that a return of the spring unit to the passive state can also be triggered manually by actuating the release element. In other words, the force assistance on the swiveling compartment can also be deactivated manually.

In a preferred embodiment, the release element is a toggle lever that can be swiveled between the release position and the rest position. Such a toggle lever is easy to operate manually on the one hand, but can also be easily actuated by a counter element on the other.

In a preferred embodiment, the locking device contains a latching device, e.g. a pin projecting towards the connection element, which can be moved transversely to a direction of movement of the connection element (movement between the connection and zero position, in particular in a straight line). The latching device is biased towards the connection element and thus the locking of the connection element. The connection element contains a counter latching device for the latching device, e.g. a recess/blind hole/latching edge etc. for interacting with/receiving the pin. The connection element is locked in place by engaging the latching device and counter latching device in the connection position, i.e. this is what causes it to engage. By contrast, the release element-when this is in the release position-means that the latching device and counter latching device cannot be latched apart (and unlatched); latching and locking are thus prevented.

This type of mechanical solution is particularly easy to realize in the connection unit.

In a preferred embodiment, the stowage compartment does not contain any electrical components. In other words, the stowage compartment does not require any electrical components and is therefore particularly simple, namely purely mechanical. Alternatively or additionally, the switchover between active and passive state, i.e. the activation/deactivation of the closing force assistance by the spring unit in the stowage compartment, is independent of the loading of the stowage compartment. In other words, this makes the stowage compartment particularly simple, as no weighing devices or similar measures are required.

Nevertheless, the stowage compartment offers convenient force assistance for opening and closing the swiveling compartment, which can be switched on or off as required.

With the objects of the invention in view, there is concomitantly provided an aircraft which contains the above-mentioned basic structure and the stowage compartment according to the invention. The main body is fixed to the basic structure of the aircraft as explained above.

The aircraft and at least some of its possible embodiments as well as the respective advantages have already been explained in conjunction with the stowage compartment according to the invention.

The invention is based on the following findings, observations and considerations and also includes the following preferred embodiments. These embodiments are sometimes also referred to as "the invention" for the sake of simplicity. The embodiments may also include or correspond to parts or combinations of the above-mentioned embodiments and/or may also include embodiments not previously mentioned.

According to the invention, a lockable push-button with gas pressure spring for a lowerable luggage compartment in an aircraft cabin is provided.

The result is a mechanical force assistance system with a lockable push-button and a gas pressure spring, which is set to continuous operation by pressing the push-button until a defined movement (swiveling compartment in closed position) is completed.

The invention is based on the realization that a very large manual force is required to close the luggage compartment when it is fully loaded. The basic concept of the invention is a locked circuit of the gas pressure spring in order to decouple the triggering (switching to the active state) and closing process (moving the swiveling compartment from the open position to the closed position).

According to the invention, no fully automatic solutions with electric motors or force assistance solutions with electronic weighing units are required. Also, due to the locking mechanism, a switch (connection element) does not need to be held during the start of the closing process. By dispensing with fully automatic solutions that use an electric motor to perform the necessary lifting work, the high costs, high weight and electrical power requirements of the units are avoided. No force-assisting systems based on an electronic weighing unit and electrical connection of the mechanical force accumulators are required. This also avoids the high price and expense of the electrical supply and the risk of false triggering.

According to the invention, the following results, in particular: A gas pressure spring (spring device) unlocks (active state) when a valve on the piston is actuated via a Bowden cable (pulling device). This requires a certain amount of force, depending on the lever arm of the actuating lever and the gas pressure. In order to prevent the gas pressure spring from locking again, the valve must remain open until a certain stroke (expansion of the spring device) has taken place. This requires the locking (by the locking device) of the switch (closing device), so that the force can be applied to the valve with a single actuation (closing device is brought into the closing position) and thus the gas pressure spring can be permanently unlocked without moving (expanding). The operator can now concentrate on closing (the swiveling compartment), which is now force-assisted, regardless of the time.

In the housing (connection unit) of the push-button (connection element) there is a slide with a pin (latching device) that is spring-loaded and locks the push-button in a certain position (connection position).

When the luggage compartment (swiveling compartment) is closed, the push-button only returns to the basic position (zero position) when the luggage compartment has been completely closed (closed position). This is done via an installed bracket (counter element for release element) which is mounted on the luggage compartment housing (main body). This presses on a lever system (the release element connected to it), which is located inside the housing (connection unit). This lever (release element) in turn triggers a movement in the spring-loaded slide, which moves to the defined rear position (release of the locking) and the push-button returns to the basic position (zero position) due to the specified bias, which is transmitted from the gas pressure spring to the push-button mechanism by using a Bowden cable.

During the next opening step of the luggage compartment, the piston rod of the gas pressure spring is compressed again by movement (the spring device is tensioned). Compression takes place via a ball on the gas pressure spring and a holder system (ball mount) on the luggage compartment (swiveling compartment), which has a holder for this ball.

During this compression, the energy is stored again in the gas pressure spring and the piston rod is locked (passive state) until the next time the push-button is actuated.

Actuation of the push-button can be reset to the basic position (zero position) via the concealed lever mechanism (release element) which protrudes slightly from the housing (connection unit), "RESET."

The force assistance unit (spring unit) only provides support up to a specified point (swiveling range, before reaching the closed position) to prevent fingers from being trapped between the luggage compartment (swiveling compartment) and the housing (main body).

The invention provides a purely mechanical solution with a push-button that has a Z movement (straight line), which can only be locked at a certain point (connection position), inside the housing by lever movements and spring force assistance. This push-button only returns to the basic position (zero position) when the luggage compartment is fully closed and engages in the luggage compartment housing (closed position). Operation is simpler, as actuating the switch (connection element) and closing the luggage compartment are now, or can be, two independent steps.

According to the invention, purely mechanical force assistance is provided by a gas pressure spring in combination with a highly integrated push-button that only locks or releases at a defined point (connection position). The gas pressure spring has an integrated anti-trap protection during the closing process of the luggage compartment.

Other features which are considered as characteristic for the invention are set forth in the appended claims.

Although the invention is illustrated and described herein as embodied in an aircraft and an aircraft stowage compartment having a force assistance system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
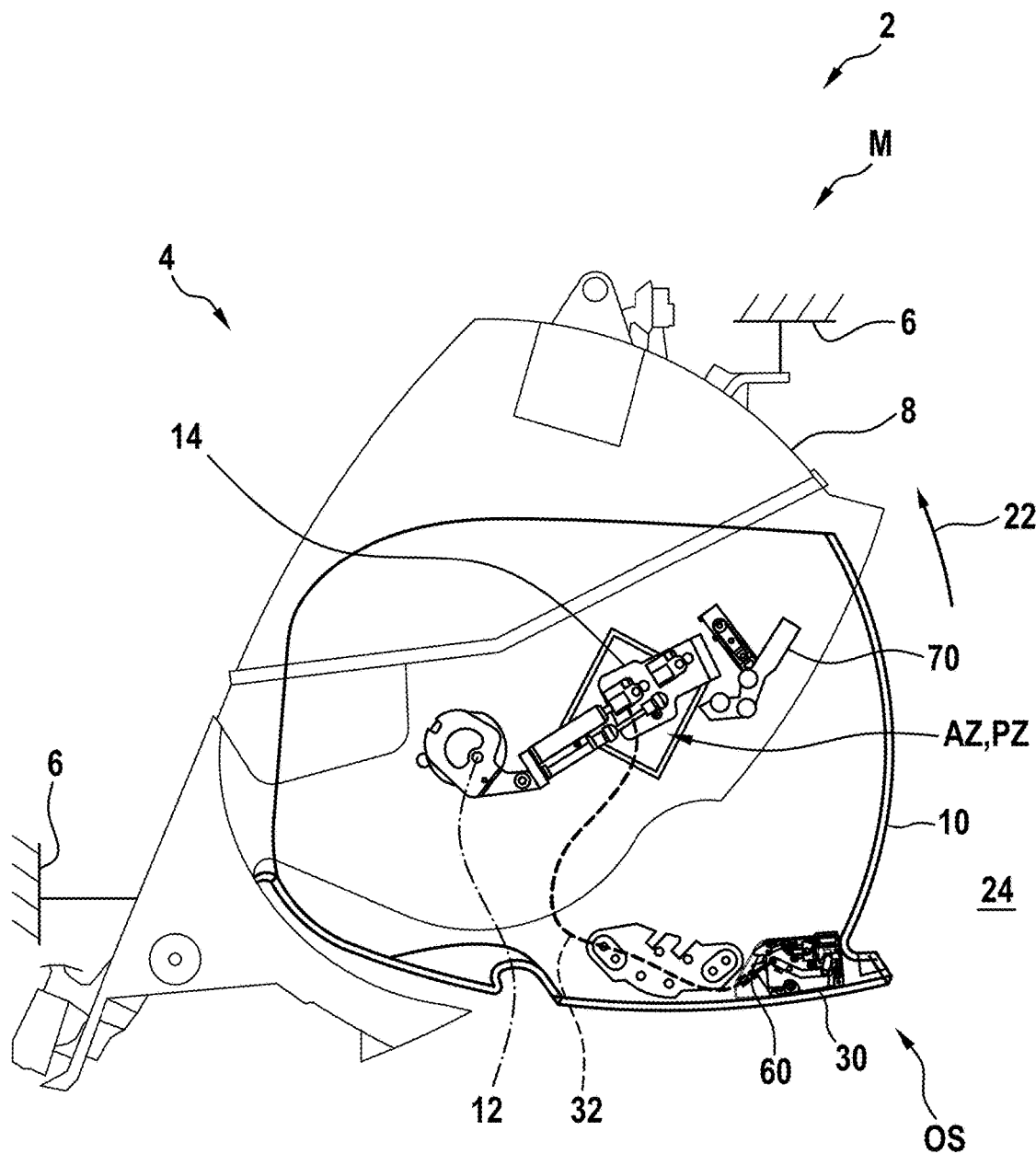
FIG. 1 is a diagrammatic, partially transparent, side-elevational view of a stowage compartment in an aircraft with a swiveling compartment in the open position.

Referring now to the figures of the drawings in detail and first, particularly, to FIG. 1 thereof, there is seen a detail of an aircraft 2, namely a stowage compartment 4, which is fixed to a basic structure 6 (only symbolically indicated therein) of the aircraft 2 in an installation state M. The stowage compartment 4 contains a main body 8. The stowage compartment 4 is fixed to the basic structure 6 in that the main body 8 is fixed to it. The stowage compartment 4 also contains a swiveling compartment 10, which is pivotably mounted between an open position OS shown in FIG. 1 and a closed position SS shown in FIG. 7. The swivel mounting is realized by mounting the swiveling compartment 10 about a swivel axis 12 on the main body 8.

The stowage compartment 4 contains a spring unit 14, which is connected both to the main body 8 and to the swiveling compartment 10 and is thus coupled for movement between the two or is supported between the two. The spring unit 14 can be switched between an active state AZ and a passive state PZ, as will be explained further below. FIG. 1 shows the situation for both states. FIG. 1 shows a state in which the stowage compartment 4 or luggage compartment is open and ready for loading. The spring unit 14 is a combination of a spring device 16 in the form of a gas pressure spring and an oil damper 18.

Figure 2:
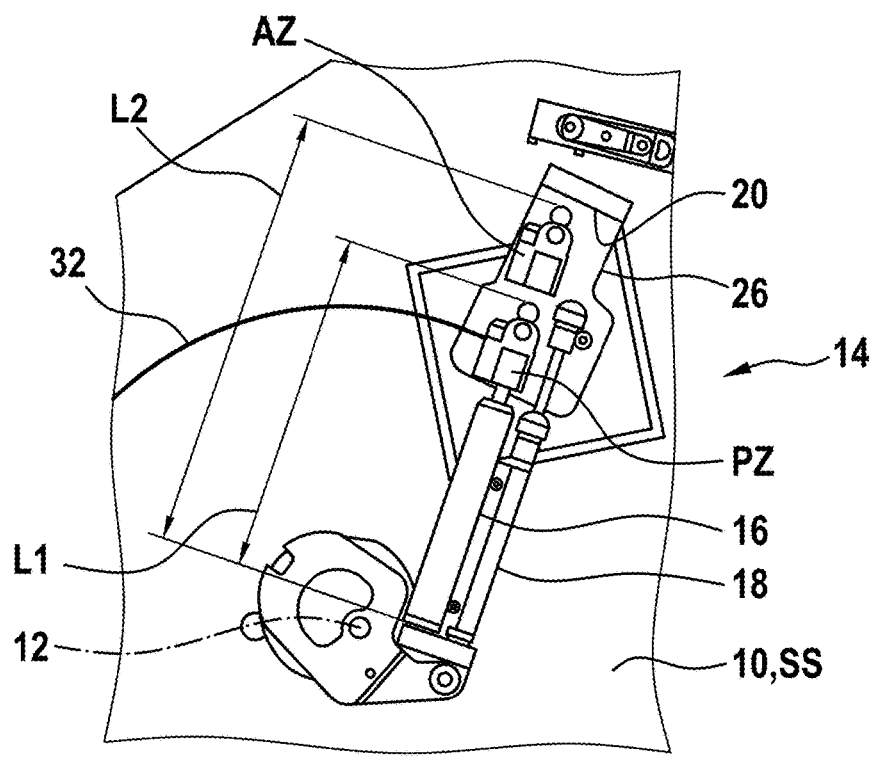
FIG. 2 is a detail of the side-elevational view of the stowage compartment of FIG. 1 with the swiveling compartment in the closed position and a spring unit in the active and passive state.

FIG. 2 shows the spring unit 14 in detail, wherein the swiveling compartment 10 is in the closed position SS. The spring unit 14 is therefore expanded compared to FIG. 1. This always applies to the oil damper 18. In the passive state PZ, however, the spring device 16 always remains compressed, i.e. it has the length L1. A ball at the end of the spring device 16 moves away from a ball mount 20.

In the active state AZ, on the other hand, the spring device 16 also expands to the length L2 so that the ball engages with the ball mount 20. In this way, the spring force of the spring device 16 can be transmitted to the swiveling compartment 10 via the ball mount 20. Both situations are symbolically indicated or drawn together in FIG. 2, the end of the spring device 16 therefore being shown twice.

In the passive state PZ at the length L1, the spring device 16 and thus the spring unit 14 does not cause any assisting force for the swiveling compartment 10. In the active state AZ, on the other hand, the spring device 16 is supported on the ball mount 20 and thus provides an assisting force for the swiveling compartment 10 during a closing movement 22 (indicated by an arrow in FIG. 1) by relaxing the spring device 16 and against the closing movement 22 by compressing the spring device 16.

FIG. 2 thus shows a holder system 26, which is not explained in more detail, with ball mounts for a gas pressure ball and a damper ball.

FIG. 1 shows that the stowage compartment 4 also contains a connection unit 30, which is operatively coupled to the spring unit 14 in that the connection unit 30 causes the spring unit 14 to switch between the active state AZ and the passive state PZ. The operative coupling is effected by a pulling device 32, in this case a Bowden cable, which is merely indicated by a dashed line in FIG. 1.

Figure 3:
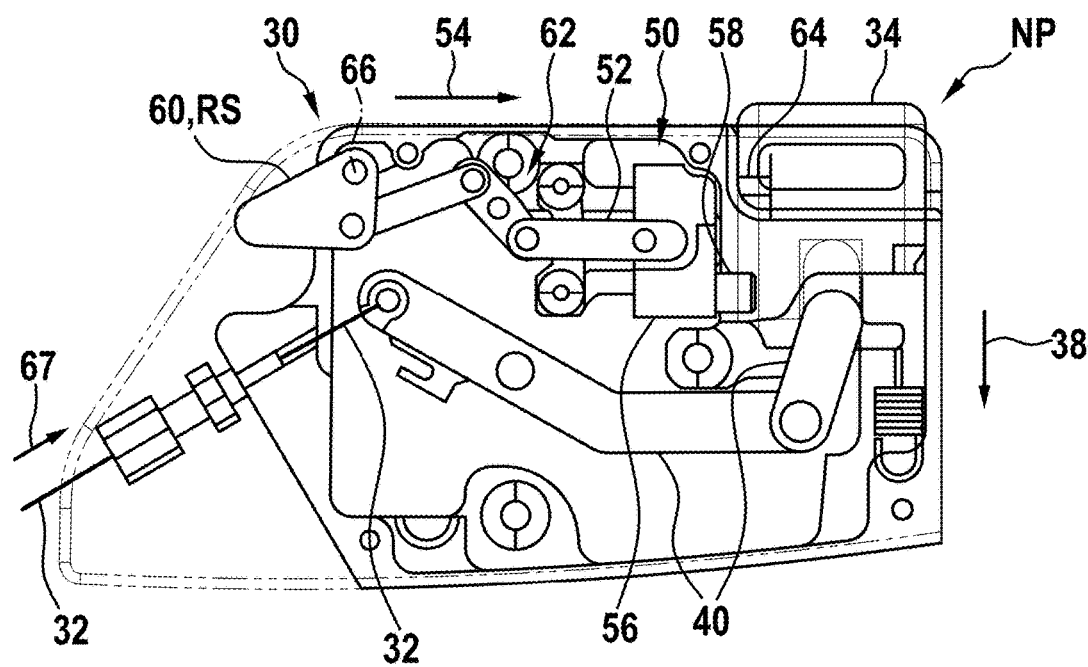
FIG. 3 is side-elevational view of the connection unit of FIG. 1 with a connection element in the zero position and a release element in the rest position.

FIG. 3 shows the connection unit 30 in detail. This connection unit 30 contains a connection element 34, in this case a push-button. The connection element 34 can be moved from a zero position NP shown in FIG. 3 to a connection position ZP shown in FIG. 4, in this case by pressing the push-button in a direction of movement 38, which represents a straight line as the direction of pressing of the push-button, indicated by an arrow in FIG. 3. In the zero position NP, the active coupling switches the spring unit 14 to the passive state PZ and in the connection position ZP to the active state AZ. The active coupling takes place via a lever mechanism 40, which is not explained in detail herein, and the pulling device 32. The connection element 34 is biased towards the zero position NP, in this case by the spring unit 14, as will be explained below. The bias is transferred to the connection element 34 by the motion coupling via the lever mechanism 40 and the pulling device 32. The pulling device 32 is therefore a Bowden cable to the gas pressure spring. The connection unit 30 can also be referred to herein as a "push-button housing."

The connection unit 30 contains a locking device 50, in this case a slide 56 with a latching device 58 in the form of a pin. With the aid of a tensioning element 52 in the form of a spring, the locking device 50 is biased in a tensioning direction 54 (indicated by an arrow) towards the connection element 34. The locking device 50 serves to lock the connection element 34 in the connection position ZP. For this purpose, the connection element 34 has a counter latching device 64 that matches the latching device 58, in this case in the form of a blind hole in the push-button. The clamping element 52 therefore biases the locking device 50 towards a locking position (when the connection element 34 is in the connection position ZP). The slide 56 is therefore a spring-loaded slide with a pin.

The connection unit 30 contains a release element 60 for the locking device 50. The release element 60 can be actuated from a rest position RS shown in FIG. 3 into a release position LS shown in FIG. 4. In the rest position RS, locking of the connection element 34 is enabled by the locking device 50; in the release position LS, this locking is prevented or an existing locking is released. For this purpose, the release element 60 and the locking device 50 are movably coupled to one another via a lever system 62. The release element 60 in this case is a rocker lever that can be swivelled about a swivel axis 66 between the release position LS and the rest position RS. The release element 60 can also be referred to as a "lever for unlocking the push-button." In FIG. 3, the push-button is therefore in a basic position, in particular when the luggage compartment is open.

FIG. 3 shows the rest position RS of the release element 60 and how the locking device 50 is therefore ready to lock the connection element 34.

Figure 4:
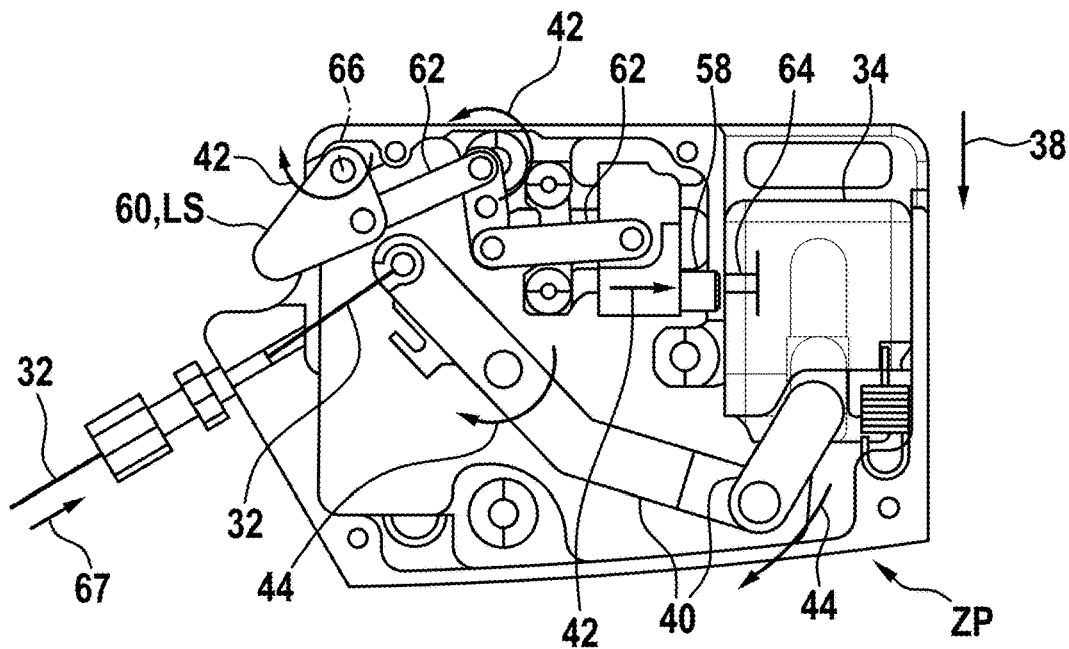
FIG. 4 is a side-elevational view of the connection unit of FIG. 3 with the connection element in the connection position and the release element in the release position.

FIG. 4 shows the release element 60 in the release position LS and how the locking device 50 is retracted to the left via the lever system 62 in the figure. An existing locking of the connection element 34 is therefore released or renewed locking is not possible. FIG. 4 therefore shows how the release element 60 in the release position LS keeps the latching device 58 and counter latching device 64 apart, unlatched.

FIG. 4 illustrates by arrows 42 how, after pressing the push-button in the direction of pressing or direction of movement 38, the pin retracts into the push-button, the lever system 62 rotates and the release element moves from the release position LS to the rest position RS. By pressing the push-button, the Bowden cable is pulled in the pulling direction 67 via the rotary movement of the lever mechanism (arrows 44). In other words, the push-button is released and the gas pressure in the gas pressure spring is released. The pin engages in the push-button.

Figure 5:
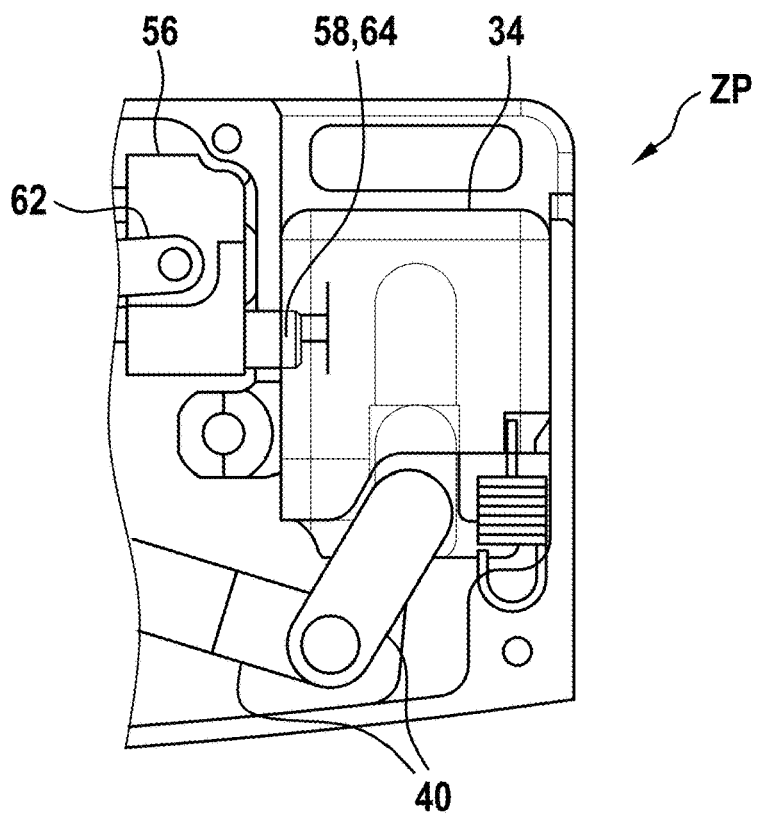
FIG. 5 is a side-elevational view of the connection unit of FIG. 4 with the release element in the rest position.

FIG. 5 shows in detail how the locking device 50 locks the connection element 34 in the connection position ZP. The latching device 58 in the form of the pin lies in the counter latching device 64 in the form of the blind hole after the connection element 34 has been pressed down in the direction of pressing 38 as shown in FIG. 3 and the latching device 58 has moved into the counter latching device 64 due to the tensioning element 52 (spring). A movement of the connection element 34 against the direction of pressing 38 is now prevented.

FIG. 1 illustrates how the release element 60, at least in the open position OS of the swiveling compartment 10, can be manually actuated from outside the stowage compartment, namely from its external space 24, in order to bring it into the release position LS. In other words, a flight attendant or passenger can manually release a latching of the connection element 34 in the connection position ZP by reaching into the open swiveling compartment 10 behind the connection unit 30 and pressing down the release element 60. The force assistance for the closing movement 22 of the swiveling compartment 10 is thus deactivated.

Figure 6:
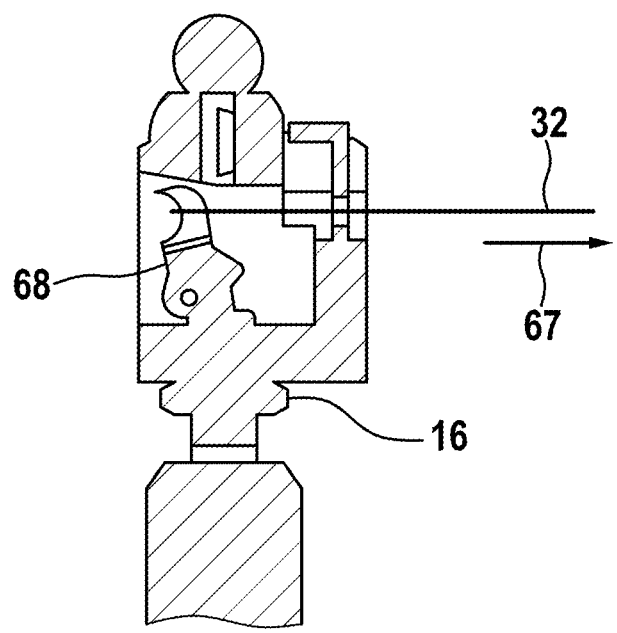
FIG. 6 is a detail of a cross-sectional view of the spring element of the spring unit of FIG. 1.

FIG. 6 shows the upper end of the spring device 16 of FIG. 2 in detail with the pulling device 32, i.e. the Bowden cable with connection to the push-button. The spring device 16 is switched back and forth between the passive state PZ shown in FIG. 6 and the active state AZ via the pulling device 32. Switching to the active state is achieved by moving the connection element 34 in the direction of movement 38, i.e. manual pressing of the push-button, e.g. by a passenger or flight attendant.

This pulls the pulling device 32 in the pulling direction 67, which is why an internal actuating element 68, in this case a lever, in the spring device 16 in FIG. 6 is moved to the right and an internal pin is kept pressed in the gas pressure spring in order to activate its spring properties. If the pulling device (by moving the connection element 34 against the direction of movement 38) is pulled back against the pulling direction 67, the lever 68 in FIG. 6 tilts to the left, the internal pin is relieved and the spring property is deactivated. This return movement is caused by an internal spring in the spring device 16, not shown, acting on the actuating element 68, which thus also causes the biasing of the connection element 34 into the zero position NP.

Figure 7:
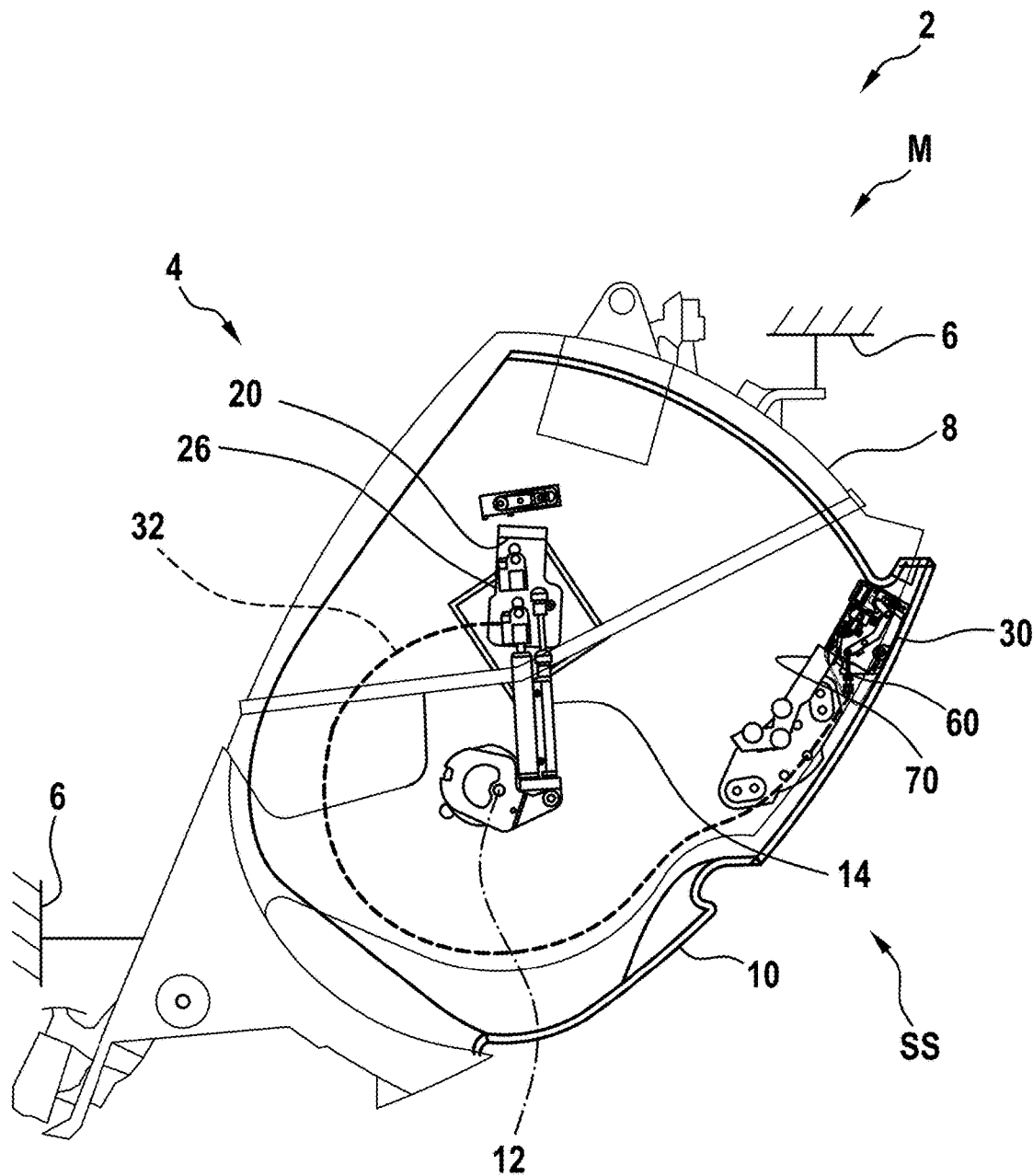
FIG. 7 is a side-elevational view of the stowage compartment of FIG. 1 with the swiveling compartment in the closed position and the release element in the release position.
Figure 8:
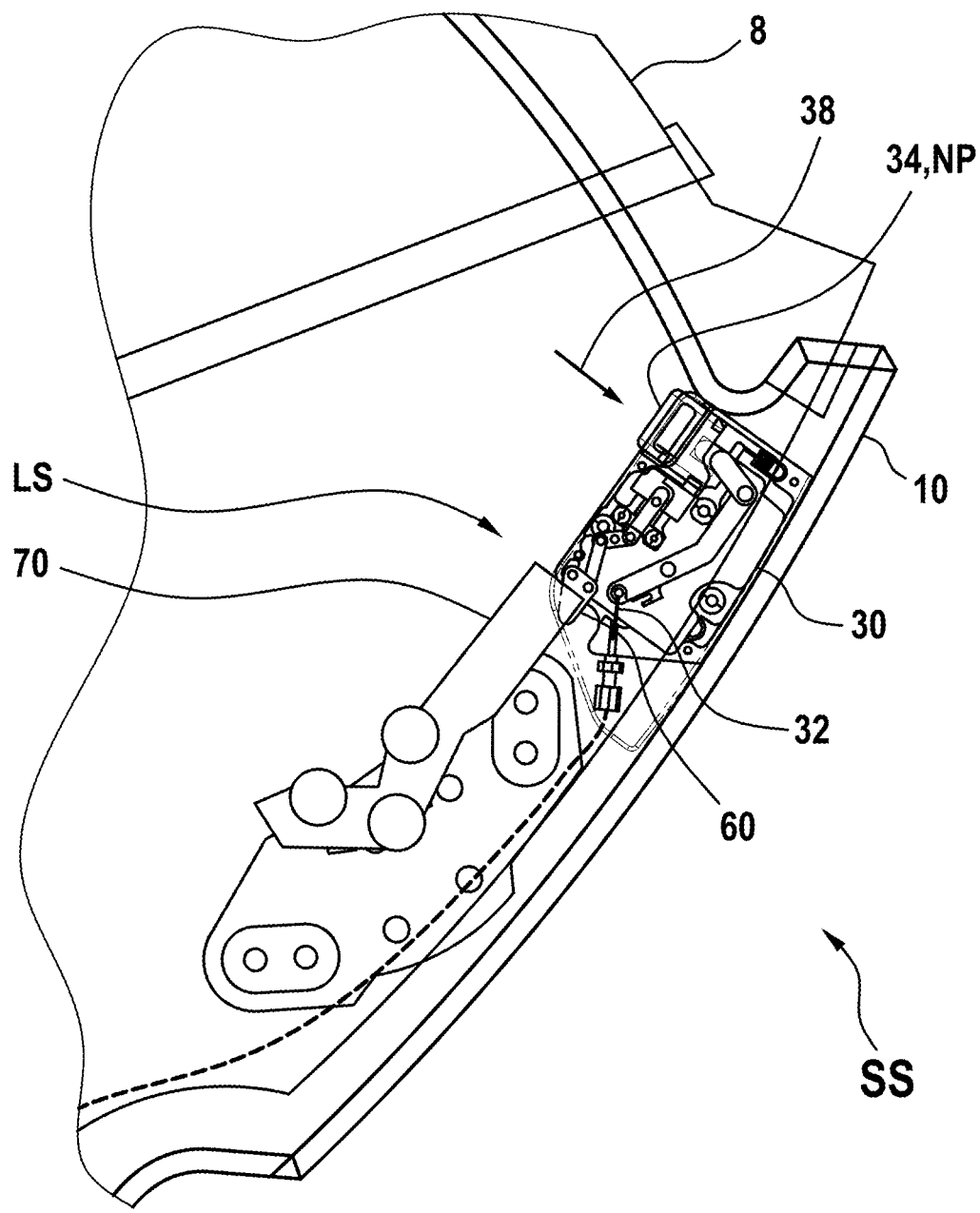
FIG. 8 is an enlarged detail of the side-elevational view of FIG. 7 with the connection unit and the counter element for the release element.

FIG. 7 shows the swiveling compartment 10 in the closed state SS. As in FIG. 1, a counter element 70 for the release element 60, which is attached to the main body 8 of the stowage compartment 4, can be seen therein. The counter element 70 is a bracket in this case. In the closed position SS of the swiveling compartment 10 shown in FIG. 7, the release element 60 moves against the counter element 70 and is brought into the release position LS by the counter element 70. FIG. 7 shows this in an overview, FIG. 8 in detail.

Figure 9:
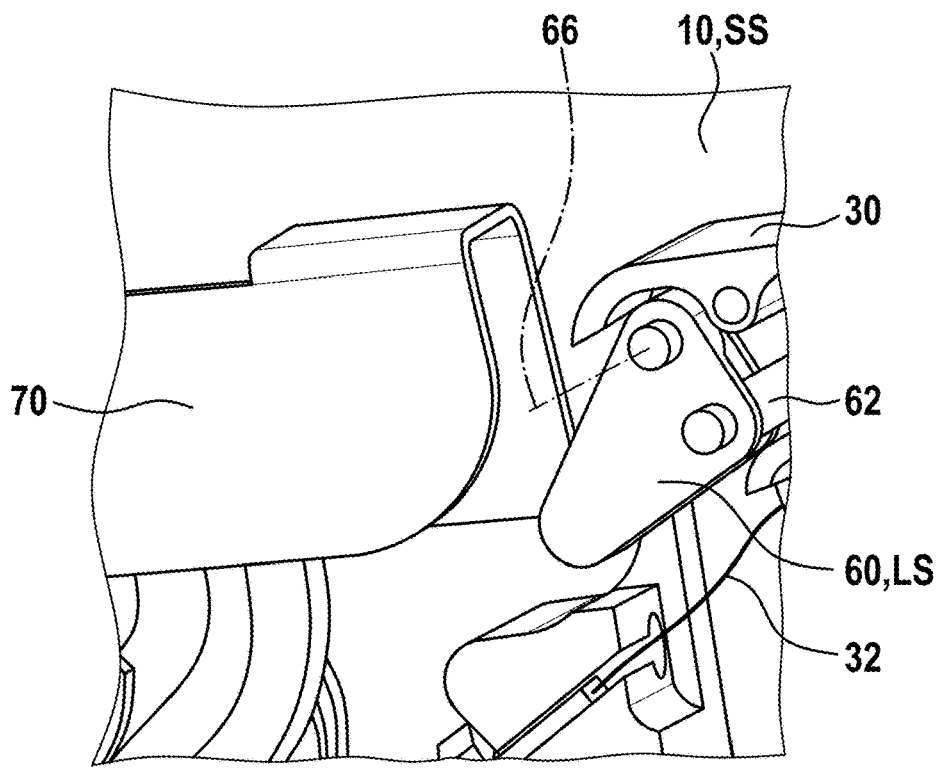
FIG. 9 is a perspective view of a further enlarged detail of FIG. 8.

FIG. 9 shows the interaction between the counter element 70 and the release element 60 in a perspective view, again enlarged in detail. The course of the pulling device 32 is indicated therein merely symbolically by a course line.

Overall, the lever in the form of the release element 60 is therefore pressed "downwards," which causes the rotary movement (against the arrows 42, see FIG. 4) of the lever system 62 and the retraction of the pin from the push-button. The biasing force of the internal pin on the gas pressure spring (acting on the lever 68 in FIG. 6) therefore pushes the push-button "upwards" again, i.e. against the direction of movement 38.

Based on FIG. 7, the following then applies: When the luggage compartment is opened (swiveling compartment 10 from the closed position SS to the open position OS), the piston of the gas pressure spring is compressed again in the cylinder and locks in the lower (compressed) position. This takes place via a ball on the side of the gas pressure spring, see FIG. 10. On the luggage compartment side (swiveling compartment 10), a holder system is fitted which includes the ball mount 20.

Figure 10:
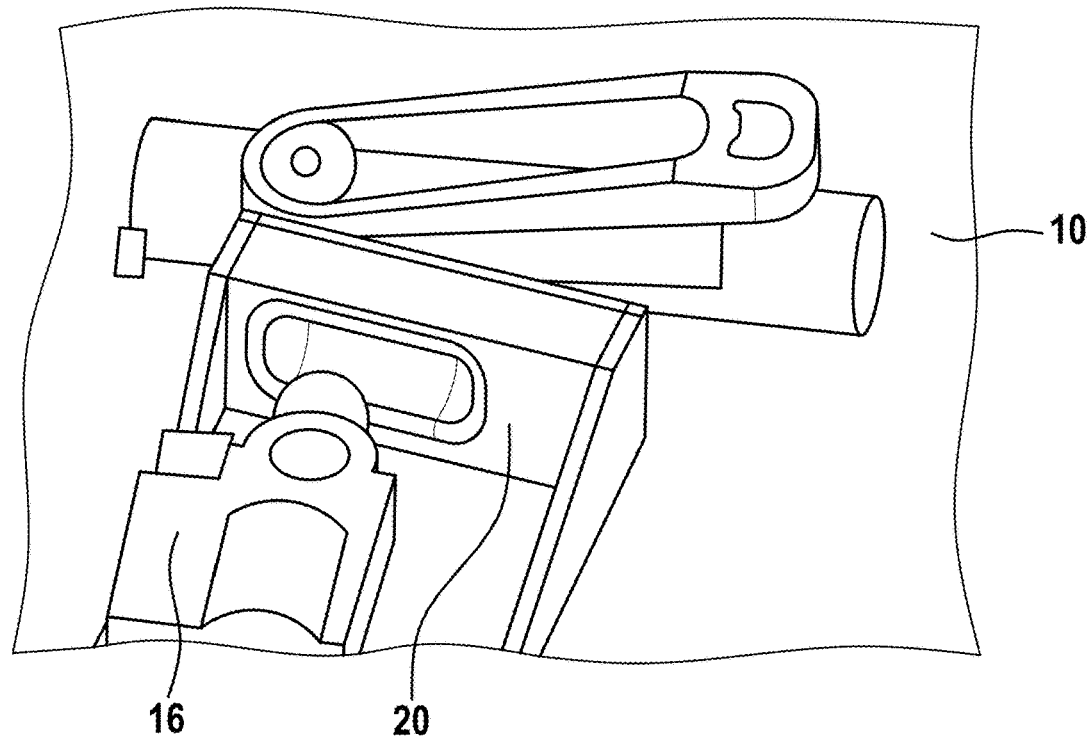
FIG. 10 is a perspective view of a detail of FIG. 7 showing a portion of the spring unit and a ball mount.

Lastly, FIG. 10 illustrates the interaction between the spring device 16 or the gas spring ball and the ball mount 20 of FIG. 2 in a perspective view.

The following is a summary list of reference numerals and the corresponding structure used in the above description of the invention:

2 aircraft
4 stowage compartment
6 basic structure
8 main body
10 swiveling compartment
12 swivel axis (swiveling compartment)
14 spring unit
16 spring device
18 oil damper
20 ball mount
22 closing movement
24 external space (stowage compartment)
26 holder system
30 connection unit
32 pulling device
34 connection element
38 direction of movement
40 lever mechanism (connection element)
42 arrow
44 arrow
50 locking device
52 clamping element (locking device)
54 clamping direction
56 slide
58 latching device
60 release element
62 lever system
64 counter latching device
66 swivel axis (release element)
67 pulling direction
68 actuating element
70 counter element (release element)
M installation state
OS open position
SS closed position
AZ active state
PZ passive state
NP zero position
ZP connection position
RS rest position
LS release position
L1,2 length

The invention claimed is:

1. A stowage compartment for an aircraft, the stowage compartment comprising:
a main body configured to be fixed to a basic structure of the aircraft;
a swiveling compartment mounted to swivel between an open position and a closed position;
a spring unit fastened to said main body and to said swiveling compartment, said spring unit being motion-coupled to said swiveling compartment and configured to be switched between an active state and a passive state;
said spring unit having a spring device being relaxed in said active state for enabling a closing force on said swiveling compartment to be generated in a direction from said open position to said closed position, said spring device being prevented from relaxing in said passive state;
a connection unit operatively coupled to said spring unit, said connection unit having a connection element configured to be brought from a zero position into a connection position;
said spring unit being switched into said passive state in said zero position and into said active state in said connection position;
said connection element being biased towards said zero position;
said connection unit having a locking device for said connection element in said connection position, said locking device being biased towards locking of said connection element;
said connection unit having a release element for said locking device, said release element configured to be actuated from a rest position into a release position, said release element being biased towards said rest position; and
in said rest position, locking of said connection element in said connection position being enabled by said locking device and locking of said connection element in said release position being prevented.

2. The stowage compartment according to claim 1, wherein said connection unit is a push-button unit and said connection element is a push-button configured to be pressed from said zero position into said connection position.

3. The stowage compartment according to claim 1, which further comprises a pulling device operatively coupling said connection unit to said spring unit.

4. The stowage compartment according to claim 1, wherein said connection element is biased from said connection position towards said zero position by a restoring force from outside said connection unit.

5. The stowage compartment according to claim 1, wherein said spring device of said spring unit is a gas pressure spring.

6. The stowage compartment according to claim 5, wherein said gas pressure spring has a resiliently pretensioned actuating element being actuated for switching said spring unit between said active state and said passive state.

7. The stowage compartment according to claim 1, which further comprises a counter element for said release element, said counter element being attached to said main body or to the basic structure, and said counter element bringing said release element into said release position at least in said closed position of said swiveling compartment.

8. The stowage compartment according to claim 1, wherein said release element is accessible, at least in said open position of said swiveling compartment, for manual actuation from an external space outside the stowage compartment at least towards said release position.

9. The stowage compartment according to claim 1, wherein said release element is a rocker lever configured to be swiveled between said release position and said rest position.

10. The stowage compartment according to claim 1, wherein:
said locking device is a latching device being movable transversely to a direction of movement of said connection element and being biased towards said connection element;
said connection element has a counter latching device;
locking of said connection element is effected by engagement of said latching device and said counter latching device in said connection position; and
said latching device and said counter latching device are held apart, and unable to be latched, by said release element in said release position.

11. The stowage compartment according to claim 1, wherein the stowage compartment does not contain any electrical components.

12. The stowage compartment according to claim 1, wherein a switchover between said active state and said passive state is independent of a load in the stowage compartment.

13. The stowage compartment according to claim 1, wherein:
the stowage compartment does not contain any electrical components; and
a switchover between said active state and said passive state is independent of a load in the stowage compartment.

14. An aircraft, comprising:
said basic structure; and
said stowage compartment according to claim 1;
said main body being fixed to said basic structure.

* * * * *